(12) United States Patent
Hunter

(10) Patent No.: US 8,408,581 B1
(45) Date of Patent: Apr. 2, 2013

(54) COLLAPSIBLE SHOPPING CART DEVICE

(76) Inventor: Nancy E. Hunter, Sarasota, FL (US)

( * ) Notice: Subject to any disclaimer, the term of this patent is extended or adjusted under 35 U.S.C. 154(b) by 150 days.

(21) Appl. No.: 13/170,100

(22) Filed: Jun. 27, 2011

(51) Int. Cl.
*B62B 3/02* (2006.01)

(52) U.S. Cl. .................. 280/651; 280/38; 280/33.993

(58) Field of Classification Search .............. 280/38, 280/43, 33.992, 33.993, 33.997, 640, 639, 280/641, 651, 652, 659
See application file for complete search history.

(56) References Cited

U.S. PATENT DOCUMENTS

| | | | | |
|---|---|---|---|---|
| 2,613,951 A | * | 10/1952 | Rusnak | 280/651 |
| 3,074,734 A | * | 1/1963 | Munson et al. | 280/641 |
| 3,388,920 A | * | 6/1968 | Hill, Sr. et al. | 280/641 |
| 3,782,749 A | * | 1/1974 | Wiczer | 280/641 |
| 4,192,541 A | * | 3/1980 | Ferneau | 296/20 |
| 4,478,428 A | * | 10/1984 | Ziliani | 280/651 |
| 5,149,125 A | * | 9/1992 | Gray | 280/651 |
| 5,649,718 A | * | 7/1997 | Groglio | 280/641 |
| 6,045,150 A | * | 4/2000 | Al-Toukhi | 280/641 |
| 6,220,611 B1 | * | 4/2001 | Shapiro | 280/47.34 |
| 6,431,319 B1 | | 8/2002 | Myers et al. | |
| 6,575,491 B2 | | 6/2003 | Miller | |
| 7,080,844 B2 | | 7/2006 | Espejo | |
| 2005/0140119 A1 | * | 6/2005 | Wong | 280/651 |
| 2008/0303248 A1 | * | 12/2008 | Chaparro | 280/651 |
| 2011/0169235 A1 | * | 7/2011 | Moster | 280/30 |

* cited by examiner

*Primary Examiner* — Frank Vanaman

(57) ABSTRACT

The collapsible shopping cart device provides a shopping cart with pivoting telescopic legs. Two spaced apart front legs mount to a pair of spaced apart leg pivots proximal to the basket bottom front. The pivoted legs provide for total collapse to the basket bottom or extension to positions that allow the basket to be selectively varied in height above a given surface such as a store floor. The basket may be provided with hinges between the basket sides and front and back and the basket bottom such that sides, front, and back may collapse for even greater collapsibility for either transport or storage. The sides, front and back are selectively locked in place when expanded. The seat bottom and back may be removable. The handle may be removable. The entire basket and its upwardly disposed components may therefore provide extreme compactability.

3 Claims, 6 Drawing Sheets

COLLAPSIBLE SHOPPING CART DEVICE

BACKGROUND OF THE INVENTION

Shopping carts are ubiquitous in many stores. Their usefulness is fully established. Shopping carts, though, belong to the various stores that provide them. Carrying a shopping cart in most vehicles, even if user purchased, is either impossible or impractical. Therefore, upon arrival at a final destination, such as home, with purchased goods, transporting those goods from an automobile to a desired location is quite laborious and inconvenient. The present device provides a collapsible cart that can be easily transported, expanded for use at a given store, and collapsed for transport to a final destination. The cart device can then again be expanded for use in conveying items from an automobile.

FIELD OF THE INVENTION

The collapsible shopping cart device relates to shopping carts.

SUMMARY OF THE INVENTION

The general purpose of the collapsible shopping cart device, described subsequently in greater detail, is to provide a collapsible shopping cart device which has many novel features that result in an improved collapsible shopping cart device which is not anticipated, rendered obvious, suggested, or even implied by prior art, either alone or in combination thereof.

To attain this, the collapsible shopping cart device provides a shopping cart with pivoting telescopic legs. Two spaced apart front legs mount to a pair of spaced apart leg pivots proximal to the basket bottom front. The pivoted legs provide for total collapse to the basket bottom or extension to positions that allow the basket to be selectively varied in height above a given surface such as a store floor. The basket may be provided with hinges between the basket sides and front and back and the basket bottom such that sides, front, and back may collapse for even greater collapsibility for either transport or storage. The sides, front and back are selectively locked in place when expanded. The seat bottom and back may be removable. The handle may be removable. The entire basket and its upwardly disposed components may therefore provide extreme compactability.

A further important feature is the pair of spaced apart casters mounted to the basket front bottom. When the front telescopic legs and the angled telescopic legs are folded to the basket bottom, the front casters provide for easy loading and unloading into and out of an automobile.

Thus has been broadly outlined the more important features of the improved collapsible shopping cart device so that the detailed description thereof that follows may be better understood and in order that the present contribution to the art may be better appreciated.

An object of the collapsible shopping cart device is to provide for use in conveying goods while shopping.

Another object of the collapsible shopping cart device is to provide a collapsible basket for ease of transport.

A further object of the collapsible shopping cart device is to provide a collapsible frame for ease of transport.

An added object of the collapsible shopping cart device is to provide for height adjustability.

And, an object of the collapsible shopping cart device is to provide a removable child seat.

Still another object of the collapsible shopping cart device is to provide a removable handle.

These together with additional objects, features and advantages of the improved collapsible shopping cart device will be readily apparent to those of ordinary skill in the art upon reading the following detailed description of presently preferred, but nonetheless illustrative, embodiments of the improved collapsible shopping cart device when taken in conjunction with the accompanying drawings.

DETAILED DESCRIPTION OF THE DRAWINGS

With reference now to the drawings, and in particular FIGS. 1 through 6 thereof, the principles and concepts of the collapsible shopping cart device generally designated by the reference number 10 will be described.

Figure 5:
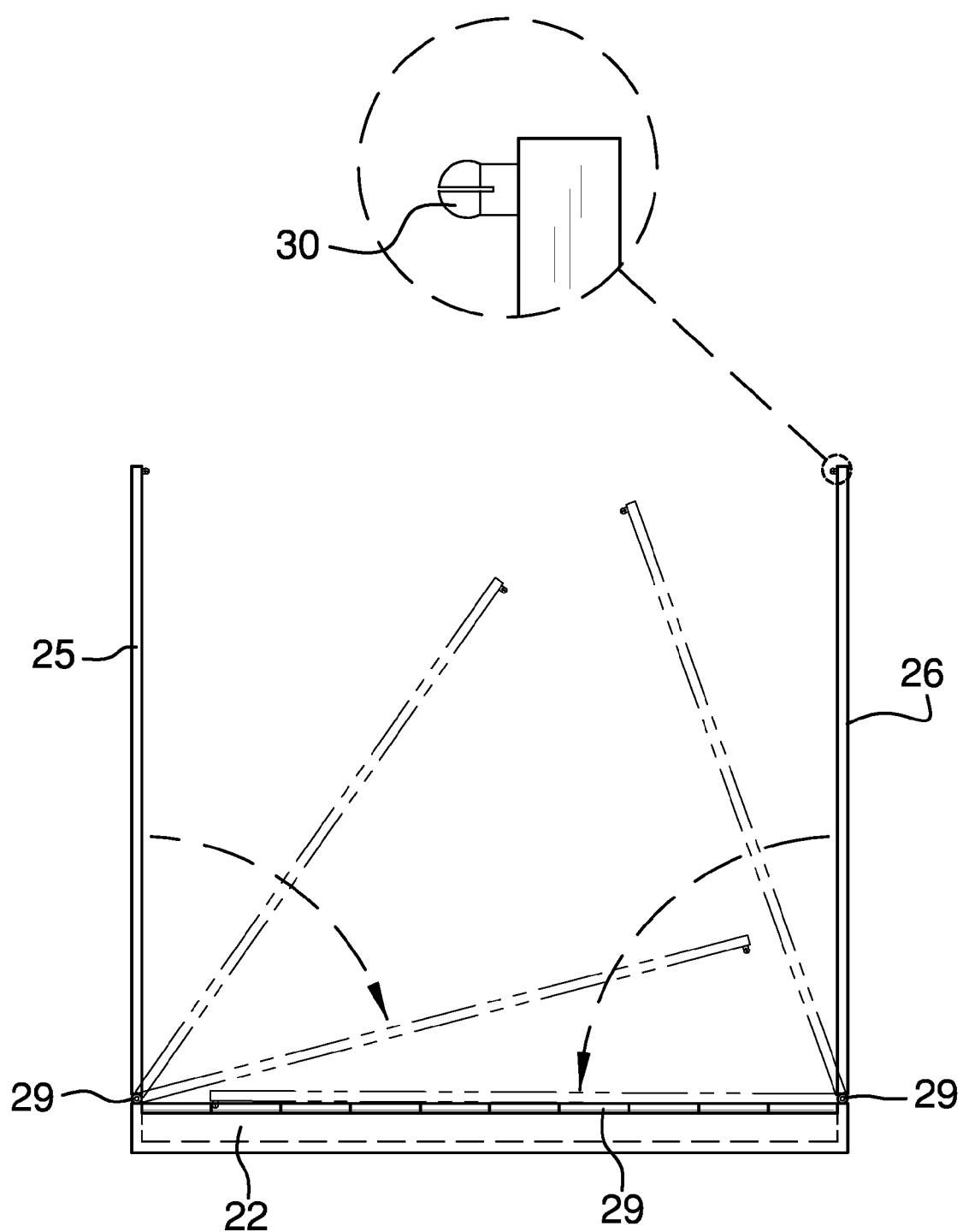
FIG. 5 is an end elevation view of the collapsible basket.

Referring to FIG. 5, the device 10 partially comprises the collapsible open mesh basket 20.

Figure 1:
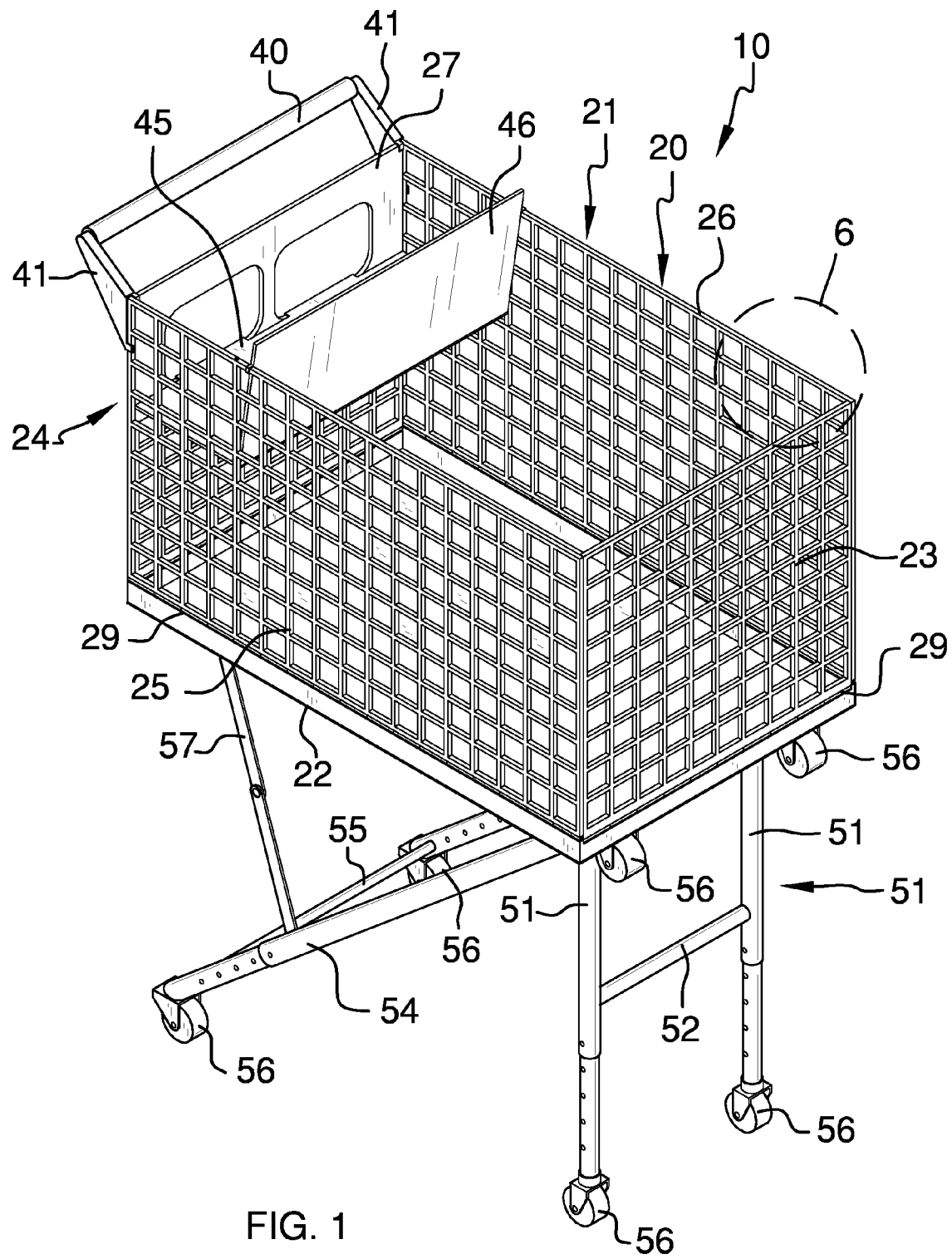
FIG. 1 is a top perspective view.

Referring to FIG. 1, the basket 20 has a top 21 spaced apart from a lipped bottom 22, a front 23 spaced apart from a rear 24, and a first side 25 spaced apart from a second side 26. The leg receipt panel 27 is disposed uppermost in the basket 20 rear 24.

Figure 4:
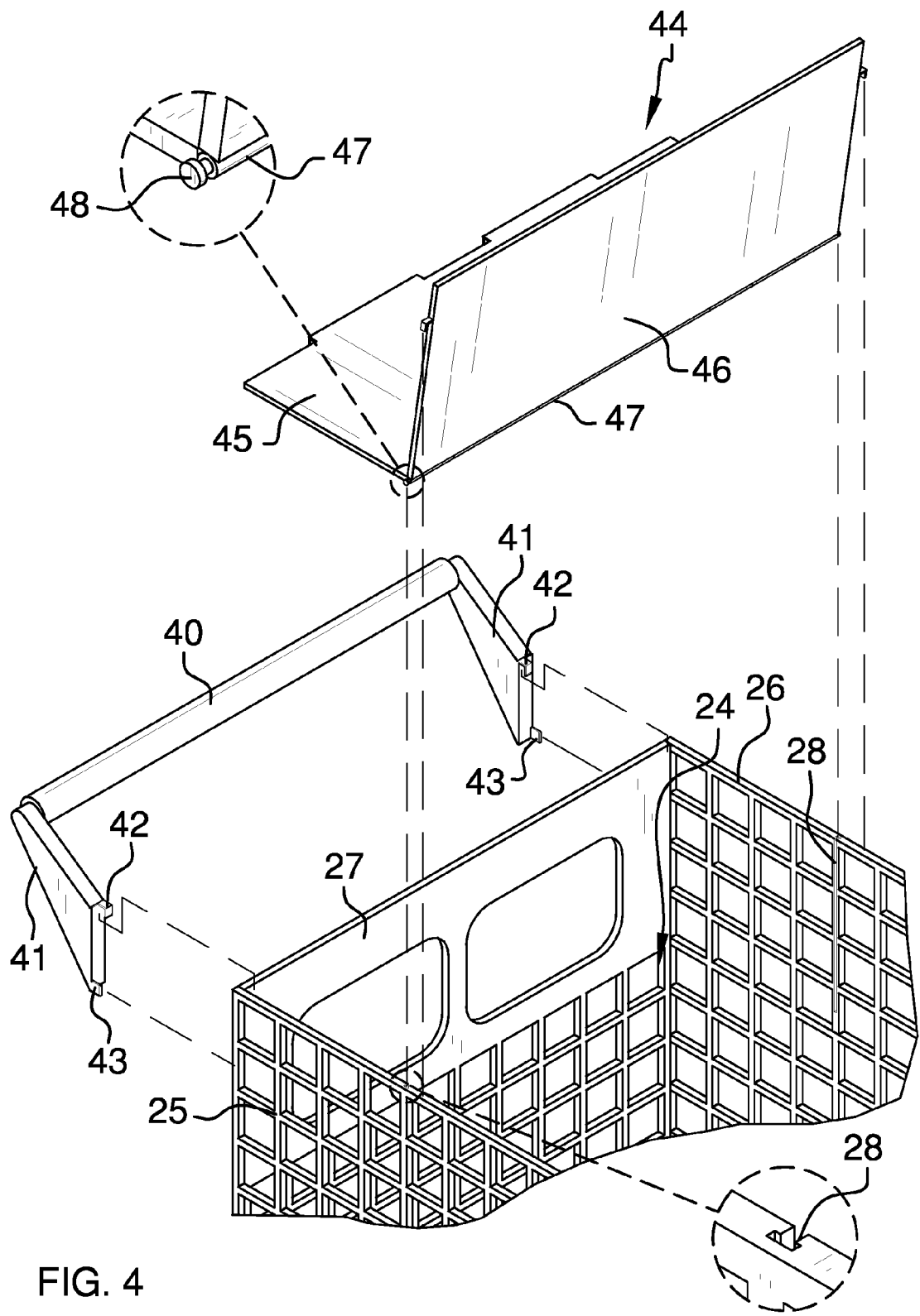
FIG. 4 is a partial top perspective view, handle and seat removed.

Referring to FIG. 4, a slot 28 is disposed vertically and upwardly within each basket 20 side. Each slot 28 is proximal to the rear 24.

Referring to FIG. 5, a hinge fastens each of the sides, the front 23, and the rear 24 to the basket 20 bottom 22. The bottom 22 is lipped. A plurality of lock pins 30 is provided. One lock pin 30 is disposed upwardly within each basket 20 side adjacent to the front 23. One lock pin 30 is disposed upwardly within each side adjacent to the rear 24.

Figure 6:
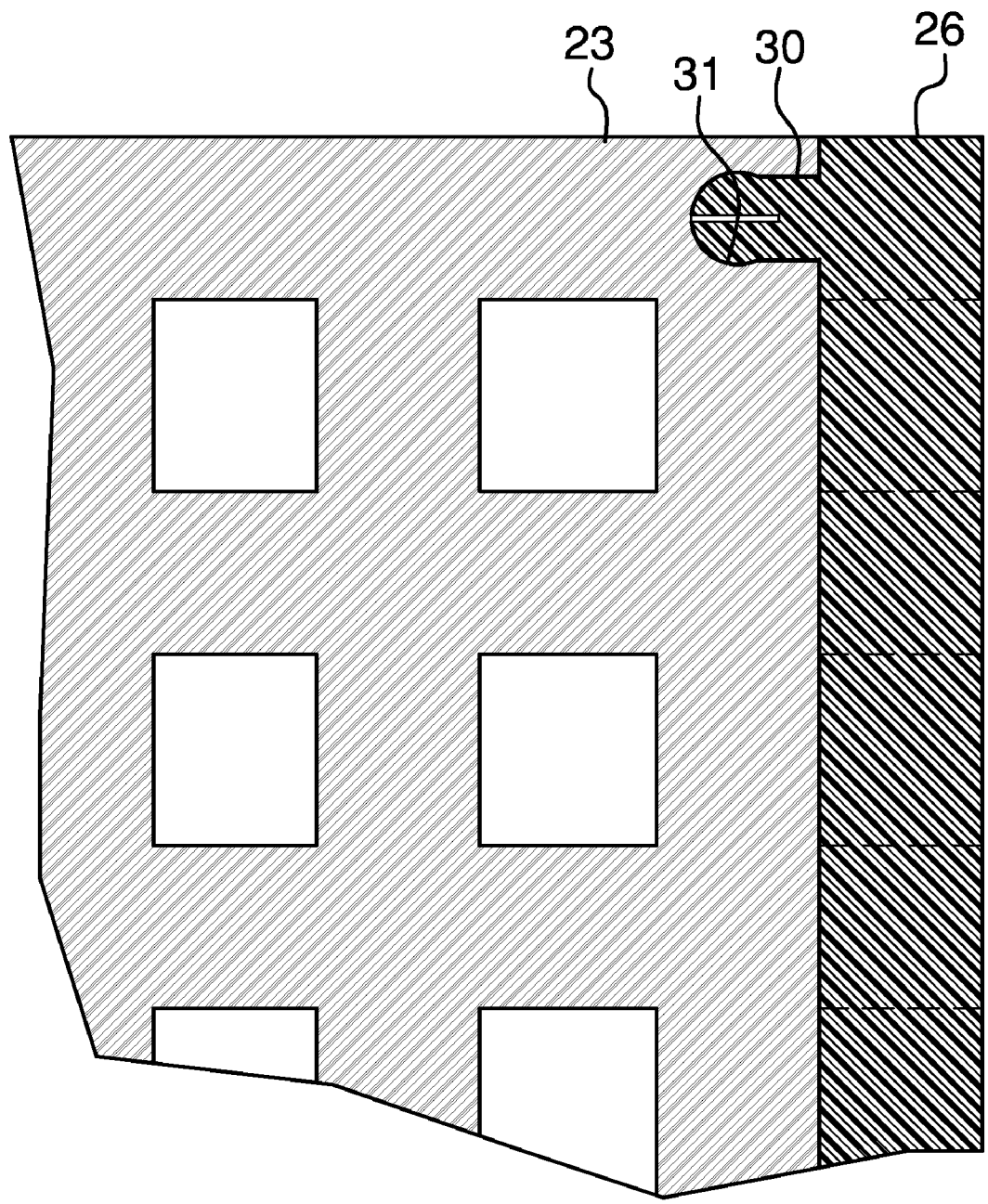
FIG. 6 is a partial cross sectional view of FIG. 1, taken along the line 6-6.

Referring to FIG. 6, a pair of pin receptacles 31 is disposed upwardly in each of the basket 20 front 23 and rear 24. Each pin receptacle 31 is in removable receipt of one lock pin 30. Referring again to FIG. 4, the removable handle 40 is disposed rearwardly on the leg receipt panel 27 via a pair of spaced apart supports 41. Each support 41 further comprises an upwardly disposed hook tab 42 spaced apart from a downwardly disposed tab 43. The hook tab 42 and tab 43 removably engage the leg receipt panel 27. The removable seat 44 has a seat bottom 45 affixed to a seat back 46 by a pivot 47. The seat bottom 45 is disposed forwardly and perpendicularly from the leg receipt panel 27. The seat back 46 is selectively disposed upwardly and forwardly from the seat bottom 45. The seat back 46 is about parallel to the leg receipt panel 27 when installed in the basket 20.

A support tab 48 is disposed upwardly on each side of the seat back 46. Each support tab 48 slideably and removably fits within a one each of the side slots 28.

Figure 2:
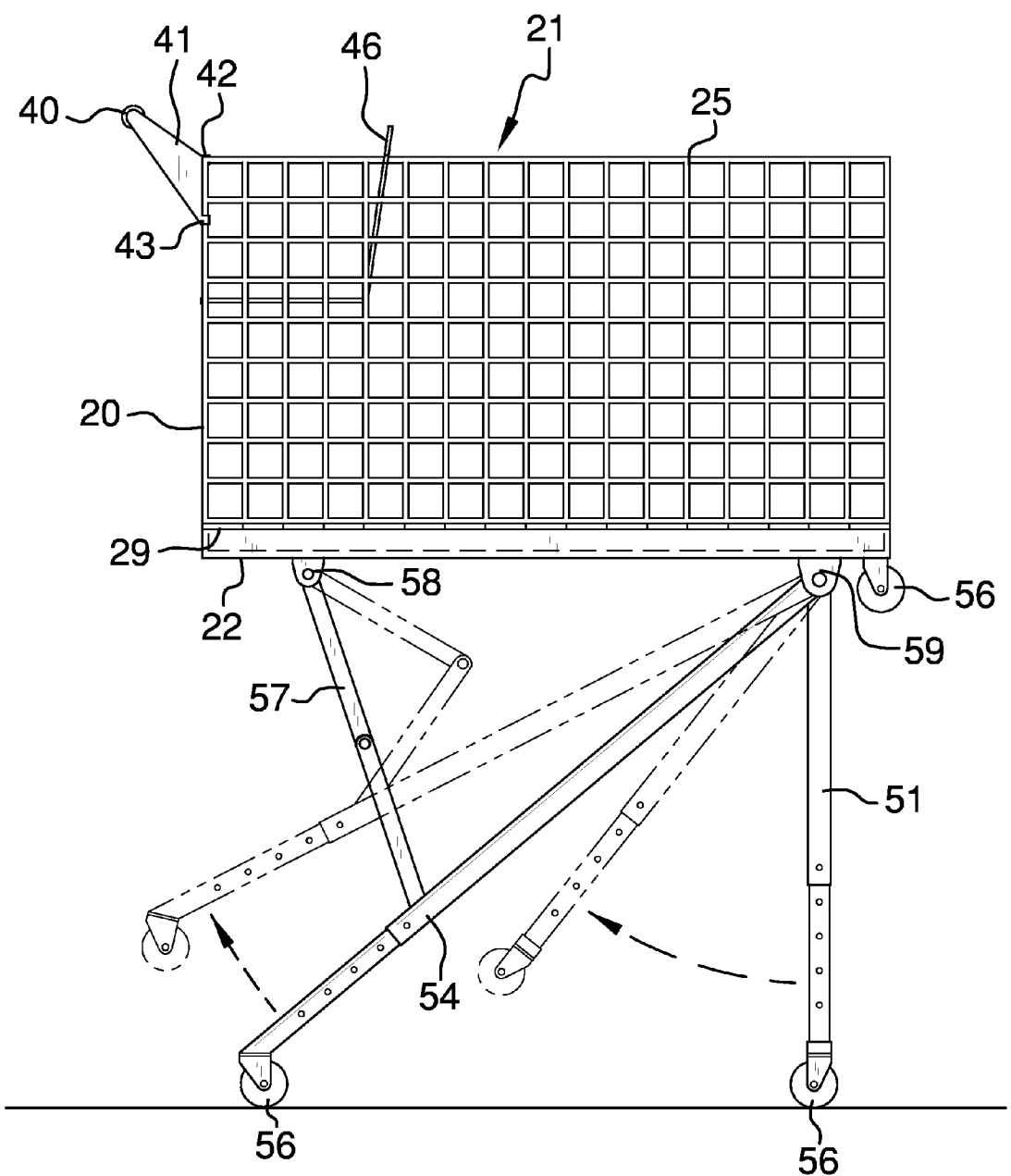
FIG. 2 is a lateral elevation view, collapsible frame extended.
Figure 3:
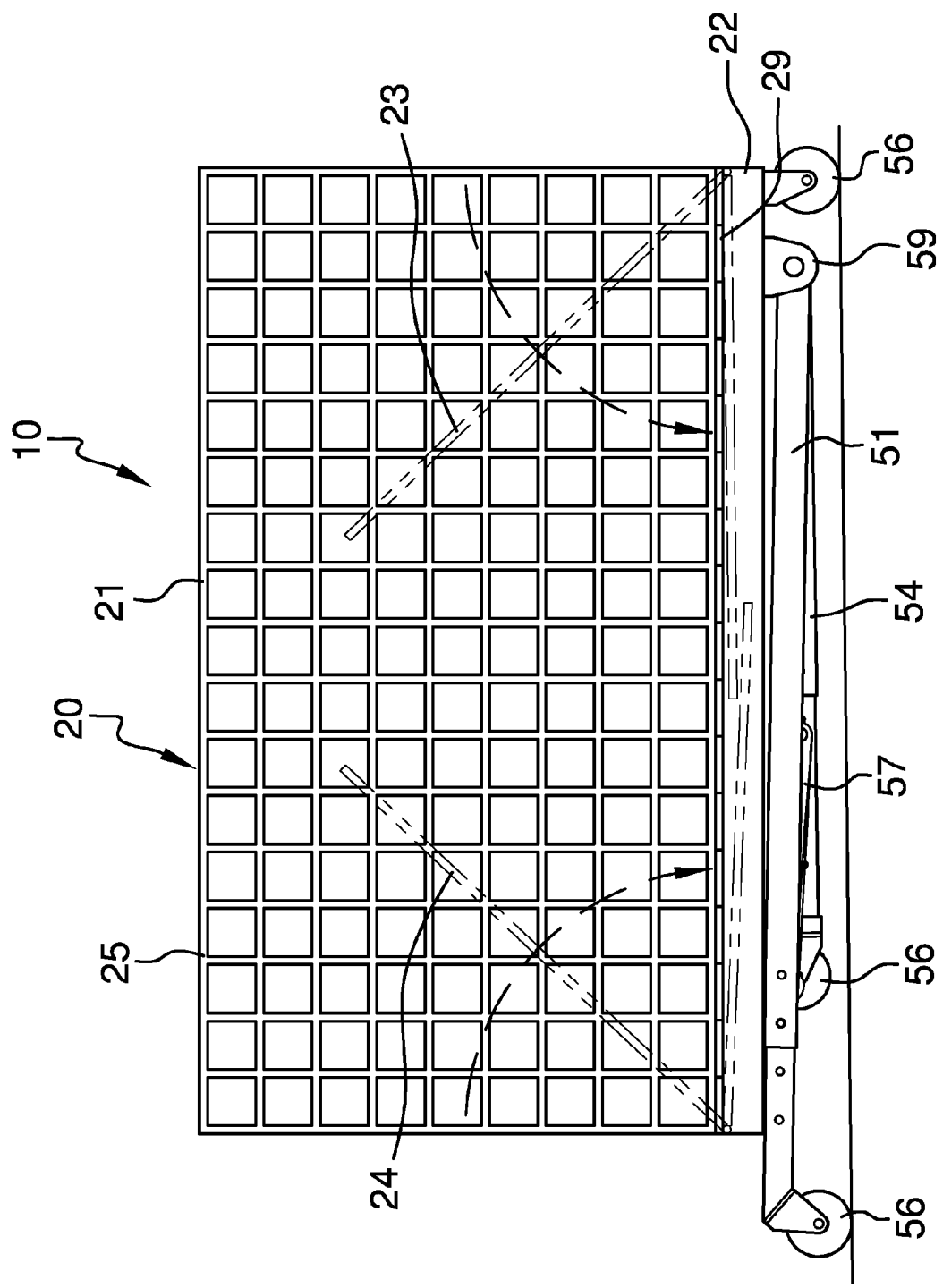
FIG. 3 is a lateral elevation view, collapsible frame collapsed.

Referring to FIG. 2, a pair of spaced apart leg pivots 59 is affixed downwardly on the basket 20 bottom 22 proximal to the front 23.

Referring to FIG. 1, a pair of front telescopic legs 51 is provided. One of each of the front telescopic legs 51 is affixed to one of each of the leg pivots 59. The front cross brace 52 connects the front telescopic legs 51.

Referring again to FIG. 2, a pair of spaced apart angled telescopic legs 54 is affixed to the leg pivots 59.

Referring again to FIG. 1, an angle leg brace 55 connects the angled telescopic legs 54. A caster 56 is disposed downwardly on each leg.

Referring to FIG. 3 and again to FIG. 1, a pair of spaced apart casters 56 is disposed downwardly on the basket 20 bottom 22 adjacent to the front 23. An inwardly bending locking arm 57 connects downwardly to the basket 20 bottom 22 at an arm pivot 58 disposed rearwardly on the bottom 22. The locking arm 57 connects downwardly to one of the angled telescopic legs 54.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the collapsible shopping cart device may be used.

What is claimed is:

1. A collapsible shopping cart device comprising, in combination:
    a collapsible open mesh basket having a top spaced apart from a bottom, a front spaced apart from a rear, and a first side spaced apart from a second side;
    a leg receipt panel disposed uppermost in the basket rear;
    a removable handle disposed rearwardly on the leg receipt panel via a pair of spaced apart supports, each support further comprising:
        an upwardly disposed hook tab spaced apart from a downwardly disposed tab, the hook tab and tab removably engaging the leg receipt panel;
    a seat having a seat bottom affixed to a seat back by a pivot, the seat bottom disposed forwardly and perpendicularly from the leg receipt panel, the seat back disposed upwardly and forwardly from the seat bottom, the seat back about parallel to the leg receipt panel;
    a pair of spaced apart leg pivots affixed downwardly on the basket bottom proximal to the front;
    a pair of front telescopic legs, one of each of the front telescopic legs affixed to one of each of the leg pivots;
    a front cross brace connecting the front telescopic legs;
    a pair of spaced apart angled telescopic legs affixed to the leg pivots;
    an angle leg brace connecting the angled telescopic legs;
    a caster disposed downwardly on each leg;
    a pair of spaced apart casters disposed downwardly on the basket bottom adjacent to the front.

2. A collapsible shopping cart device comprising, in combination:
    a collapsible open mesh basket having a top spaced apart from a bottom, a front spaced apart from a rear, and a first side spaced apart from a second side;
    a leg receipt panel disposed uppermost in the basket rear;
    a slot disposed vertically and upwardly within each basket side, each slot proximal to the rear;
    a removable handle disposed rearwardly on the leg receipt panel via a pair of spaced apart supports, each support further comprising:
        an upwardly disposed hook tab spaced apart from a downwardly disposed tab, the hook tab and tab removably engaging the leg receipt panel;
    a removable seat having a seat bottom affixed to a seat back by a pivot, the seat bottom disposed forwardly and perpendicularly from the leg receipt panel, the seat back disposed upwardly and forwardly from the seat bottom, the seat back about parallel to the leg receipt panel;
    a support tab disposed upwardly on an each side of the seat back, each support tab slideably and removably fitted within a one each of the side slots;
    a pair of spaced apart leg pivots affixed downwardly on the basket bottom proximal to the front;
    a pair of front telescopic legs, one of each of the front telescopic legs affixed to one of each of the leg pivots;
    a front cross brace connecting the front telescopic legs;
    a pair of spaced apart angled telescopic legs affixed to the leg pivots;
    an angle leg brace connecting the angled telescopic legs;
    a caster disposed downwardly on each leg;
    a pair of spaced apart casters disposed downwardly on the basket bottom adjacent to the front;
    an inwardly bending locking arm connected downwardly to the basket bottom at an arm pivot disposed rearwardly on the bottom, the locking arm further connected downwardly to one of the angled telescopic legs.

3. A collapsible shopping cart device comprising, in combination:
    a collapsible open mesh basket having a top spaced apart from a lipped bottom, a front spaced apart from a rear, and a first side spaced apart from a second side;
    a leg receipt panel disposed uppermost in the basket rear;
    a slot disposed vertically and upwardly within each basket side, each slot proximal to the rear;
    a hinge fastening each of the sides, the front, and the rear to the basket bottom;
    a plurality of lock pins, one lock pin disposed upwardly within each side adjacent to the front, one lock pin disposed upwardly within each side adjacent to the rear;
    a pair of pin receptacles disposed upwardly in each of the basket front and rear, each pin receptacle in removable receipt of a lock pin;
    a removable handle disposed rearwardly on the leg receipt panel via a pair of spaced apart supports, each support further comprising:
        an upwardly disposed hook tab spaced apart from a downwardly disposed tab, the hook tab and tab removably engaging the leg receipt panel;
    a removable seat having a seat bottom affixed to a seat back by a pivot, the seat bottom disposed forwardly and perpendicularly from the leg receipt panel, the seat back selectively disposed upwardly and forwardly from the seat bottom, the seat back about parallel to the leg receipt panel;
    a support tab disposed upwardly on an each side of the seat back, each support tab slideably and removably fitted within a one each of the side slots;
    a pair of spaced apart leg pivots affixed downwardly on the basket bottom proximal to the front;
    a pair of front telescopic legs, one of each of the front telescopic legs affixed to one of each of the leg pivots;
    a front cross brace connecting the front telescopic legs;
    a pair of spaced apart angled telescopic legs affixed to the leg pivots;
    an angle leg brace connecting the angled telescopic legs;
    a caster disposed downwardly on each leg;
    a pair of spaced apart casters disposed downwardly on the basket bottom adjacent to the front;
    an inwardly bending locking arm connected downwardly to the basket bottom at an arm pivot disposed rearwardly on the bottom, the locking arm further connected downwardly to one of the angled telescopic legs.

* * * * *